(12) United States Patent
Kraemer

(10) Patent No.: US 11,400,892 B2
(45) Date of Patent: Aug. 2, 2022

(54) WIPER ARM DEVICE

(71) Applicant: Robert Bosch GmbH, Stuttgart (DE)

(72) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 558 days.

(21) Appl. No.: 16/093,716

(22) PCT Filed: Apr. 7, 2017

(86) PCT No.: PCT/EP2017/058355
§ 371 (c)(1),
(2) Date: Oct. 15, 2018

(87) PCT Pub. No.: WO2017/178358
PCT Pub. Date: Oct. 19, 2017

(65) Prior Publication Data
US 2019/0077374 A1   Mar. 14, 2019

(30) Foreign Application Priority Data

Apr. 13, 2016 (DE) ..................... 10 2016 206 159.3

(51) Int. Cl.
*B60S 1/34* (2006.01)
*B60S 1/32* (2006.01)

(52) U.S. Cl.
CPC ............... *B60S 1/3429* (2013.01); *B60S 1/32* (2013.01); *B60S 1/3427* (2013.01);
(Continued)

(58) Field of Classification Search
CPC .... B60S 1/3427; B60S 1/3425; B60S 1/3429; B60S 1/3431; B60S 1/3447; B60S 1/3445;
(Continued)

(56) References Cited

U.S. PATENT DOCUMENTS 1,739,896 A   12/1929   Garbell
1,920,730 A * 8/1933   Wiseman .................. B60S 1/50
                                                            15/250.04
(Continued)

FOREIGN PATENT DOCUMENTS

DE   2319062        10/1974
DE   3909165   *   10/1989
(Continued)

OTHER PUBLICATIONS

Machine translation of description portion of German publication 3909165, published Oct. 1989 (Year: 1989).*
(Continued)

*Primary Examiner* — Gary K. Graham
(74) *Attorney, Agent, or Firm* — Micheal Best & Friedrich LLP

(57) ABSTRACT

The invention relates to a wiper arm device with an integrally formed wiper arm element (10) which is provided with a fastening part (12) for articulated connection and which has at least one wiper arm element portion (14) with a longitudinal extent of at least 10% of the total longitudinal extent of the wiper arm element (10). According to the invention, it is proposed that the wiper arm element portion (14) has a cross-section that differs from an at least substantially U-shaped cross-section.

25 Claims, 4 Drawing Sheets

(52) U.S. Cl.
CPC ............ B60S 1/3431 (2013.01); B60S 1/3445 (2013.01); B60S 1/3465 (2013.01); B60S 1/3468 (2013.01); B60S 1/345 (2013.01)

(58) Field of Classification Search
CPC ...... B60S 1/3468; B60S 1/345; B60S 1/3465; B60S 1/32
USPC .................................................. 15/250.351
See application file for complete search history.

(56) References Cited

U.S. PATENT DOCUMENTS

| | | | | |
|---|---|---|---|---|
| 2,092,173 | A * | 9/1937 | Le Fevre | B60S 1/3427 |
| | | | | 15/250.34 |
| 2,260,903 | A * | 10/1941 | Horton | B60S 1/3475 |
| | | | | 15/250.351 |
| 2,269,623 | A * | 1/1942 | Ehrlich | B60S 1/3468 |
| | | | | 15/250.34 |
| 2,711,553 | A * | 6/1955 | O'Shei | B60S 1/3429 |
| | | | | 15/250.351 |
| 2,838,782 | A * | 6/1958 | Wallis | B60S 1/34 |
| | | | | 15/250.352 |
| 3,339,222 | A * | 9/1967 | Bauer | B60S 1/34 |
| | | | | 15/250.34 |
| 4,343,062 | A * | 8/1982 | van den Berg | B60S 1/4003 |
| | | | | 15/250.32 |
| 5,613,268 | A * | 3/1997 | Scorsiroli | B60S 1/32 |
| | | | | 15/250.34 |
| 5,621,944 | A * | 4/1997 | Sekiguchi | B60S 1/32 |
| | | | | 15/250.31 |
| 5,778,484 | A * | 7/1998 | Lisiecki | B60S 1/34 |
| | | | | 15/250.351 |
| 7,281,294 | B2 * | 10/2007 | Wilms | B60S 1/32 |
| | | | | 15/250.32 |
| 2002/0112308 | A1 * | 8/2002 | Zimmer | B60S 1/3468 |
| | | | | 15/250.352 |
| 2004/0037631 | A1 * | 2/2004 | Vermeulen | B60S 1/3438 |
| | | | | 403/315 |
| 2004/0117938 | A1 | 6/2004 | Wilms et al. | |
| 2015/0239433 | A1 | 8/2015 | Rousseau | |

FOREIGN PATENT DOCUMENTS

| | | |
|---|---|---|
| DE | 102004008617 | 9/2005 |
| DE | 102011078108 | 12/2012 |
| DE | 102013212194 A1 | 1/2015 |
| EP | 1816043 | 8/2007 |
| FR | 3022200 A1 | 12/2015 |
| WO | 03084788 | 10/2003 |

OTHER PUBLICATIONS

International Search Report for Application No. PCT/EP2017/058355 dated Jun. 8, 2017 (English Translation, 3 pages).

* cited by examiner

WIPER ARM DEVICE

BACKGROUND OF THE INVENTION

A wiper arm with an integrally formed wiper arm element for the articulated connection to a fastening part has already been proposed.

SUMMARY OF THE INVENTION

The invention is based on a wiper arm device with an integrally formed wiper arm element which is provided for the articulated connection to a fastening part and which has at least one wiper arm element portion with a longitudinal extent of at least 10%, advantageously of at least 15% and particularly advantageously of at least 20%, of a total longitudinal extent of the wiper arm element.

It is proposed that the wiper arm element portion has a cross section which differs from an at least substantially U-shaped cross section, in particular over the entire longitudinal extent of the wiper arm element portion. In particular, in this case the cross section of the wiper arm element portion is arranged at least substantially perpendicular to a longitudinal direction of extent of the wiper arm element. In particular, the wiper arm element is provided to connect the fastening part, in particular indirectly and/or advantageously directly, to a wiper arm adapter. "Provided" is intended to be understood, in particular, as specifically designed and/or equipped. By an object being provided for a specific function is intended to be understood, in particular, that the object fulfils and/or performs this specific function in at least one use state and/or operating state.

"Wiper arm device" is intended to be understood in this connection, in particular, as at least a part, in particular a subassembly, of a wiper arm, in particular of a vehicle wiper arm. In particular, in this case the wiper arm device may also comprise the fastening part and/or the wiper arm adapter. "Fastening part" is intended to be understood, in particular, as a unit which is provided for a connection of the wiper arm element to a body component, advantageously a drive shaft, in particular a wiper arm drive shaft, of a vehicle. Moreover, "wiper arm adapter" is intended to be understood, in particular, as an element which, in particular in a mounted state, comprises at least one contact region with a wiper blade and, in particular, is provided to connect, advantageously releasably and preferably captively, the wiper arm device and/or the wiper arm, to the wiper blade.

"Integrally" is also intended to be understood, in particular, as at least connected by a material connection. The material connection may be produced, for example, by an adhesive bonding process, an injection-molding process, a welding process, a soldering process and/or another process. Advantageously "integrally" is intended to be understood as formed from one piece and/or in one piece. Preferably this one piece is produced from a single blank, a compound and/or a cast part. Moreover, a "longitudinal extent" of an object is intended to be understood, in particular, as the greatest possible extent of the object. In particular, the longitudinal extent of the wiper arm element in this case defines the longitudinal direction of extent. Moreover, the expression "at least substantially perpendicular" is intended to be understood, in particular, as an alignment of a direction relative to a reference direction, wherein the direction and the reference direction, in particular viewed in one plane, enclose an angle, in particular of between 82° and 98°, advantageously of between 85° and 95° and particularly preferably of between 88° and 92°. An "at least substantially U-shaped" cross section is also intended to be understood as a cross section which differs from a U-shaped reference cross section by a surface component of at most 30%, preferably of at most 20% and particularly preferably of at most 10%. By this embodiment, the wiper arm device and/or the wiper arm may be produced in a particularly simple and/or cost-effective manner. Additionally, a manufacturing process may be simplified and/or accelerated.

According to a further feature of the invention which, in particular, may be produced on its own or advantageously additionally to the aforementioned feature of the invention, a wiper arm device is proposed with an integrally configured wiper arm element which is provided for an articulated connection to a fastening part and which comprises at least one wiper arm element portion with a longitudinal extent of at least 10%, advantageously of at least 15% and particularly advantageously of at least 20%, of a total longitudinal extent of the wiper arm element, wherein a cross-sectional surface of the wiper arm element portion is at least substantially constant, in particular, over the entire longitudinal extent of the wiper arm element portion. In this connection, the term "at least substantially constant" is intended to be understood, in particular, that the cross-sectional surface of a cross-sectional surface averaged over the wiper arm element portion differs by at most 15%, advantageously by at most 10%, preferably by at most 5% and particularly preferably by at most 2.5%. In particular, the advantages already cited above may be achieved thereby. In particular, by a corresponding design the wiper arm device and/or the wiper arm may be produced in a particularly simple and/or cost-effective manner. Additionally, a manufacturing process may be simplified and/or accelerated.

The wiper arm element portion in this case could have an at least substantially L-shaped cross section, in particular, over the entire longitudinal extent of the wiper arm element portion. Advantageously, however, the wiper arm element portion, in particular, has an at least substantially I-shaped cross section over the entire longitudinal extent of the wiper arm element portion, whereby a particularly high cost efficiency may be achieved. Advantageously, the wiper arm element in this case is configured as a wiper arm rod. In this connection, by an "at least substantially L-shaped" cross section is intended to be understood, in particular, as a cross section which differs from an L-shaped reference cross section, by a surface component of at most 30%, preferably of at most 20% and particularly preferably of at most 10%. Additionally, by an "at least substantially I-shaped" cross section is intended to be understood, in particular, as a cross section which differs from an I-shaped, in particular linear and/or uncurved, reference cross section by a surface component of at most 30%, preferably of at most 20% and particularly preferably of at most 10%.

It is further proposed that the wiper arm element portion has at least two cross sections, the main directions of extent thereof being arranged at least substantially perpendicular to one another. "Main direction of extent" of a cross section is intended to be understood, in particular, as a direction which extends parallel to a direction of a maximum extent of the cross section. Advantageously, the main direction of extent in this case is arranged at least substantially perpendicular to the longitudinal direction of extent of the wiper arm element. As a result, in particular an advantageously simple connection may be achieved, in particular, between the wiper arm element and the fastening part and/or the wiper arm adapter.

In one embodiment of the invention, it is proposed that the wiper arm element portion has a longitudinal extent of at least 60%, advantageously of at least 70%, preferably of at least 80% and particularly preferably of at least 90% of a total longitudinal extent of the wiper arm element. Particularly advantageously, the wiper arm element portion is identical to the wiper arm element and has, in particular, a longitudinal extent which corresponds at least substantially to the entire longitudinal extent of the wiper arm element, in particular apart from tolerances and/or fastening elements. As a result, in particular, a production process may be simplified. Additionally, costs may be minimized.

Moreover, it is proposed that the wiper arm element has at least one further wiper arm element portion which in a mounted state is arranged in the vicinity of a wiper arm adapter, in particular of the wiper arm adapter already mentioned above. In particular, the wiper arm element in this case extends from the fastening part and/or in the vicinity of the fastening part to the wiper arm adapter and/or in the vicinity of the wiper arm adapter. Particularly preferably, in this case the further wiper arm element portion is at least partially identical to the wiper arm element portion. "In the vicinity" is intended to be understood, in particular, as a spatial region which is formed from points which are removed by less than a third, preferably less than a quarter, preferably less than a sixth and particularly preferably less than a tenth of the longitudinal extent of the wiper arm element, from a reference point and/or a reference component, in particular the wiper arm adapter and/or are in each case at a spacing of at most 15 cm, preferably at most 10 cm and particularly preferably at most 5 cm from a reference point and/or a reference component, in particular the wiper arm adapter. As a result, in particular, an advantageous attachment of the wiper arm adapter may be achieved.

It is further proposed that the wiper arm device comprises the fastening part which in a mounted state at least partially encompasses the wiper arm element on at least two sides and advantageously on at least three sides. Advantageously, the fastening part encompasses the wiper arm element on at least one of the sides, preferably on at least two of the sides and particularly preferably on at least three of the sides, at least to a large part and particularly advantageously entirely. In this case, the expression "at least to a large part" is intended to be understood, in particular, as at least 55%, advantageously at least 65%, preferably at least 75%, particularly preferably at least 85% and particularly advantageously at least 95%. As a result, in particular, a particularly advantageous stability and/or an advantageous fastening may be achieved.

The wiper arm element could be arranged in a central region of the fastening part and, in particular, connected to the fastening part in the central region. In a preferred embodiment of the invention, however, it is proposed that in the mounted state the wiper arm element is arranged in a lateral region of the fastening part, relative to a wiping direction, in particular of the wiper arm device and/or of the wiper arm, and, in particular, is connected in the lateral region to the fastening part. Preferably, in this case the wiper arm element is arranged on one side on the fastening part, on only one lateral region of the fastening part and, in particular, is connected on one side to the fastening part. As a result, in particular, a particularly simple construction and/or production may be achieved.

It is further proposed that, for the articulated connection to the fastening part, the wiper arm element, and in particular the wiper arm element portion, has at least one, advantageously just one, joint recess which is, in particular, bored and/or advantageously stamped and which is provided for receiving at least one joint coupling element. Advantageously, the joint recess in this case corresponds to a round hole and has, in particular, a circular contour. In particular, the wiper arm device in this case may comprise the joint coupling element. As a result, in particular, a particularly simple, rapid and/or cost-effective connection may be achieved.

If the wiper arm element and, in particular the wiper arm element portion, has at least one, advantageously just one, spring receiver recess which is configured as a slot and which is advantageously stamped and which in the mounted state is provided to receive at least one spring for spring-loading the wiper arm element, in particular a structurally simple and/or cost-effective spring-loading of the wiper arm element may be achieved. In particular, in this case the wiper arm device may comprise the spring.

Moreover, it is proposed that the wiper arm device comprises at least one cover unit which in a mounted state at least partially covers the wiper arm element and, in particular, the wiper arm element portion. Preferably, the cover unit is provided to cover at least the spring which is provided, in particular, for spring-loading the wiper arm element. The cover unit could in this case consist of a metal, such as for example aluminum, and/or a composite material, such as for example a fiber composite material. Advantageously, however, the cover unit consists at least to a large part and particularly preferably entirely of plastics material. In particular, an advantageous protective action may be achieved thereby.

The wiper arm device in this case is not intended to be limited to the above-described use and embodiment. In particular, for fulfilling a mode of operation described herein, the wiper arm device may have a number of individual elements, components and units which differs from the number cited herein.

BRIEF DESCRIPTION OF THE DRAWINGS

Further advantages are disclosed from the following description of the figures. An exemplary embodiment of the invention is shown in the drawings. The drawings, the description and the claims contain numerous features in combination. The person skilled in the art will also expediently consider the features individually and combine them to form further meaningful combinations.

In the drawings.

DETAILED DESCRIPTION

Figure 1:
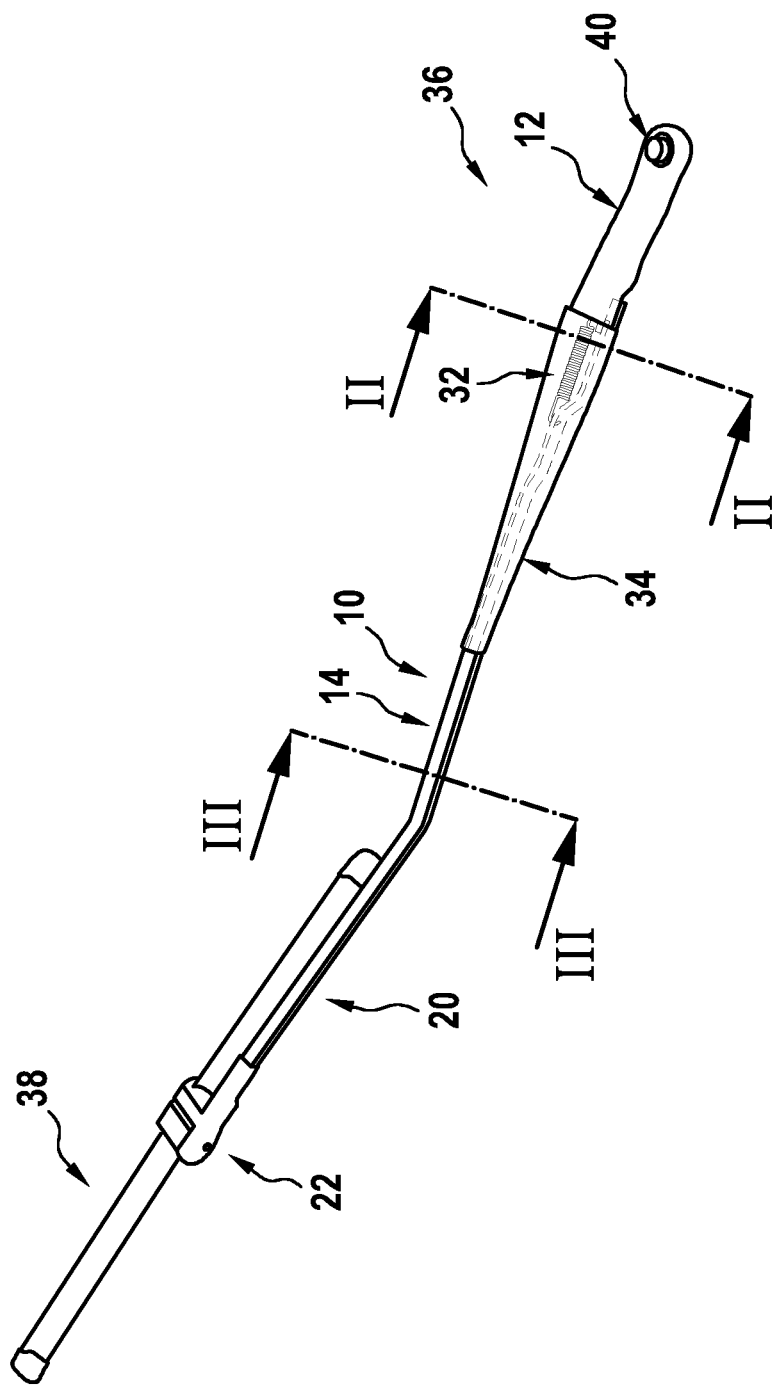
FIG. 1 shows a schematic view of a wiper blade and a wiper arm coupled to the wiper blade with a wiper arm device which comprises at least one wiper arm element.

FIG. 1 shows a wiper arm 36 with a wiper blade 38 mounted thereon in a schematic view. The wiper blade 38 is releasably coupled to the wiper arm 36. The wiper blade 38 forms a flat wiper blade. The wiper blade 38 is provided in the present case for cleaning a vehicle windshield. Alternatively, however, it is also conceivable to configure a wiper blade as an articulated wiper blade and/or any other wiper blade.

The wiper arm 36 has a wiper arm device. The wiper arm device comprises a wiper arm adapter 22. The wiper arm adapter 22 serves for coupling the wiper arm 36 to the wiper blade 38.

The wiper arm device further comprises a fastening part 12. The fastening part 12 is provided for fastening the wiper arm 36 to a drive shaft 40. The fastening part 12 is connected fixedly in terms of rotation to the drive shaft 40. The drive shaft 40 is provided for performing an oscillating rotational movement by means of a drive motor, not shown further. As a result, the wiper arm 36 and the wiper blade 38 mounted thereon are able to be driven in a reciprocating manner with a pivoting movement over the vehicle windshield.

For a connection of the wiper arm adapter 22 to the fastening part 12, the wiper arm device further comprises a wiper arm element 10. The wiper arm element 10 is configured as a bent element. The wiper arm element 10 is configured as a wiper arm rod. The wiper arm element 10 is configured integrally. The wiper arm element 10 consists at least to a large part of a metal. In the present case, the wiper arm element 10 consists of a coated metal. The wiper arm element 10 in this case has a material thickness of at most 10 mm and advantageously of at most 7 mm. In the present case, the wiper arm element 10 has a material thickness of approximately 4 mm. Alternatively, however, it is also conceivable to produce a wiper arm element entirely from a metal, such as for example stainless steel and/or aluminum, and/or at least partially from a composite material.

The wiper arm element 10 in the mounted state is connected to the fastening part 12. The wiper arm element 10 in this case is connected in an articulated manner to the fastening part 12. Additionally, the wiper arm element 10 and the fastening part 12 are spring-loaded relative to one another by means of a spring 32 of the wiper arm device.

Moreover, the wiper arm element 10 extends from the fastening part 12 as far as the wiper arm adapter 22, whereby advantageously an, in particular, additional articulated part may be dispensed with. Accordingly, the wiper arm element 10 comprises at least one further wiper arm element portion 20 which in a mounted state is arranged in the vicinity of the wiper arm adapter 22. A longitudinal extent of the wiper arm element 10 in this case defines a longitudinal direction of extent 46. The wiper arm element 10 is connected directly to the wiper arm adapter 22. In the present case, the wiper arm element 10 is connected by means of a non-positive and/or positive connection to the wiper arm adapter 22. The wiper arm element 10 in this case is connected by means of a crimped connection to the wiper arm adapter 22. Alternatively, however, it is also conceivable to configure a wiper arm element and a wiper arm adapter integrally with one another.

The wiper arm element 10 further comprises a wiper arm element portion 14. The wiper arm element portion 14 has a longitudinal extent of at least 60% of an entire longitudinal extent of the wiper arm element 10. In the present case, the wiper arm element portion 14 is identical to the wiper arm element 10 and has, therefore, in particular a longitudinal extent which corresponds at least substantially to the entire longitudinal extent of the wiper arm element 10. The wiper arm element portion 14 has a cross section over an entire longitudinal extent of the wiper arm element portion 14 which is different from a U-shaped cross section (see in particular also FIGS. 2 and 3). In the present case, the wiper arm element portion 14 has an I-shaped and/or uncurved cross section over the entire longitudinal extent of the wiper arm element portion 14. A cross-sectional surface of the wiper arm element portion 14 is at least substantially constant over the entire longitudinal extent of the wiper arm element portion 14. Alternatively, a wiper arm element portion could also extend over a different partial region of a wiper arm element, such as for example over 10%, 30% and/or 50% of a total longitudinal extent of the wiper arm element. Additionally, a wiper arm element and/or a wiper arm element portion could also have an at least substantially L-shaped and/or oval cross section.

Figure 2:
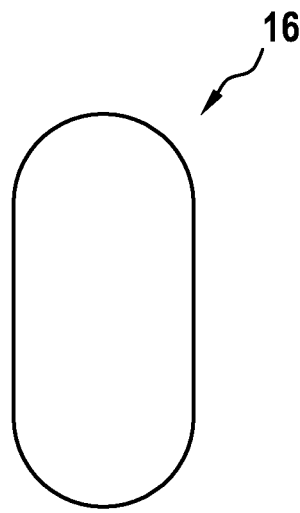
FIG. 2 shows a first cross section of the wiper arm element along the line II-II in FIG. 1.
Figure 3:
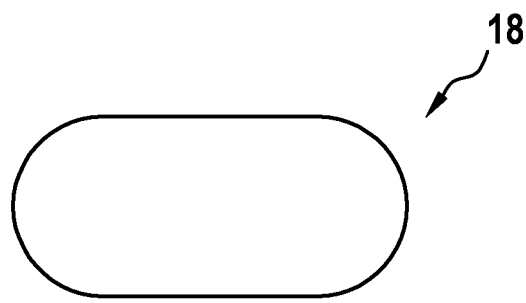
FIG. 3 shows a second cross section of the wiper arm element along the line III-III in FIG. 1.
Figure 4:
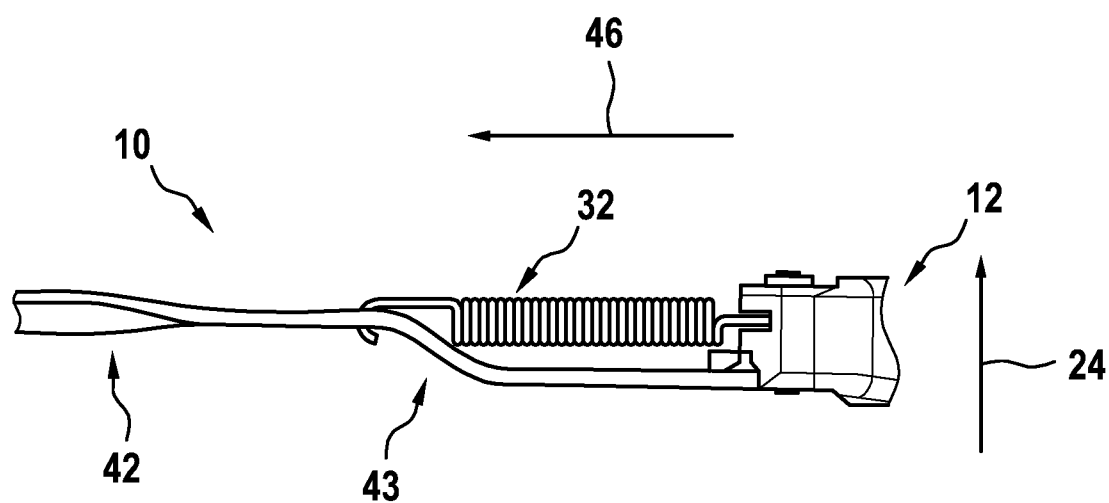
FIG. 4 shows a fastening part of the wiper arm device and a part of the wiper arm element in a view from above.
Figure 5:
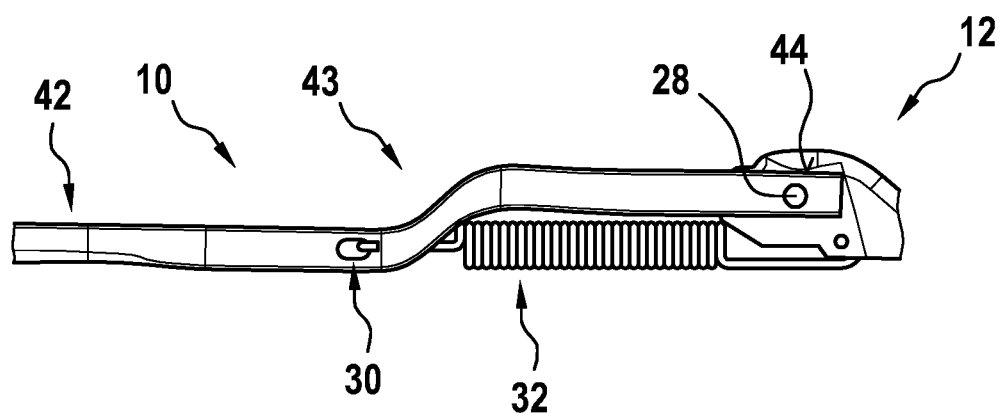
FIG. 5 shows the fastening part and the part of the wiper arm element in a side view.
Figure 6:
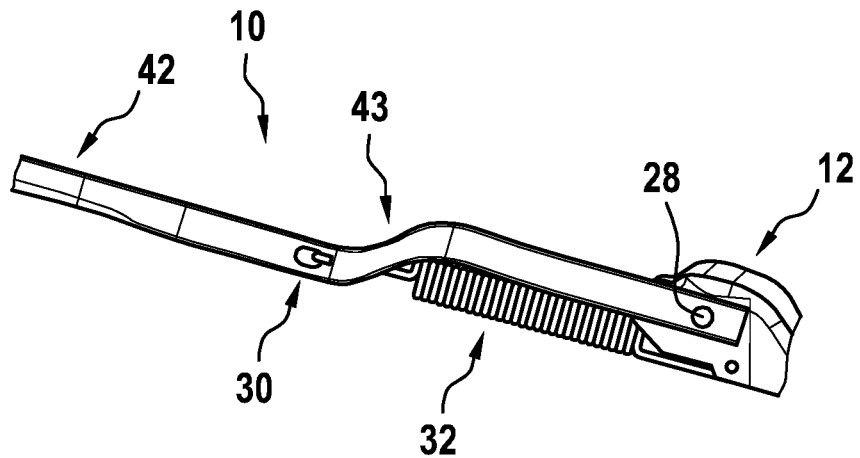
FIG. 6 shows the fastening part and the part of the wiper arm element in a perspective view.

Moreover, the wiper arm element portion 14, in particular due to the twisting of the wiper arm element 10, has at least two cross sections 16, 18, the main directions of extent thereof being arranged at least substantially perpendicular to one another (see FIGS. 2 and 3). A first cross section 16 of the cross sections 16, 18 is in this case arranged in the vicinity of the fastening part 12. The first cross section 16 has a first main extension length of between 7 mm and 15 mm. In the present case, the first cross section 16 has a main extension length of approximately 10 mm. A second cross section 18 of the cross sections 16, 18 is arranged in a central region of the wiper arm element 10 and/or in the vicinity of the wiper arm adapter 22. The second cross section 18 has a second main extension length of between 7 mm and 15 mm, arranged in particular at least substantially perpendicular to the first main extension length of the first cross section 16. In the present case, the second cross section 18 has a second main extension length of approximately 10 mm which is arranged, in particular, perpendicular to the first main extension length of the first cross section 16.

Moreover, the wiper arm device comprises a cover unit 34. The cover unit 34 is configured as a covering cap. The cover unit 34 is configured integrally. The cover unit 34 consists of plastics material. The cover unit 34 has an at least substantially U-shaped cross section. The cover unit 34 may be connected by means of a plug-on connection to the wiper arm element 10. The cover unit 34 in the mounted state is arranged in the vicinity of the fastening part 12. In this case, the cover unit 34 tapers in the direction of the wiper arm adapter 22.

The cover unit 34 at least partially covers the wiper arm element 10 in a mounted state. In the present case, the cover unit 34 extends over approximately 20% to 30% of the longitudinal extent of the wiper arm element 10. In this case, the cover unit 34 entirely covers at least the spring 32 which is provided in particular for spring-loading the wiper arm element 10. Alternatively, it is conceivable to dispense with a cover unit entirely and/or to manufacture a cover unit at least partially from a different material. Additionally, a cover unit could be configured in multiple parts.

FIGS. 4 to 7 show an attachment of the wiper arm element 10 to the fastening part 12.

In the present case, the wiper arm element 10 in the mounted state is arranged in a lateral region of the fastening part 12 relative to a wiping direction 24. The wiper arm element 10 in this case is connected to the fastening part 12 in the lateral region. Additionally, the wiper arm element 10 is connected on one side to the fastening part 12. In the present case, viewed in the upward direction of movement of the wiper arm 36, the wiper arm element 10 is arranged above the fastening part 12.

To this end, the wiper arm element 10 is twisted at least in a partial region 42 by approximately 90°, in particular by means of a bending process. Moreover, the wiper arm element 10 has in at least one further partial region 43 a three-dimensional bend, which in particular is achieved by means of a bending process, in particular an edgewise bending and/or flatwise bending in the present case. The further partial region 43 is arranged in the present case between the partial region 42 and the fastening part 12. The further partial region 43 in this case comprises, when viewed perpendicular to the vehicle windshield, an at least substantially S-shaped bend (see in particular FIG. 4). Additionally, the further partial region 43, when viewed parallel to the wiping direction 24, has an at least substantially S-shaped bend (see in particular FIG. 5). Thus the wiper arm element 10, viewed in the longitudinal direction of extent 46 of the wiper arm element 10, in the vicinity of the fastening part 12 is offset in the direction of the lateral region of the fastening part 12 and in a direction remote from the vehicle windshield.

Moreover, in a mounted state the fastening part 12 at least partially encompasses the wiper arm element 10 on three sides. In this case, the fastening part 12 encompasses a side of the wiper arm element 10 remote from the wiper arm adapter 22, a side of the wiper arm element 10 remote from the vehicle windshield and a side of the wiper arm element 10 facing the fastening part 12 in the wiping direction 24. In the present case, the fastening 12 part fully encompasses the wiper arm element 10 on the three sides. Additionally, a side of the fastening part 12 remote from the vehicle windshield forms a stop surface 44 for the wiper arm element 10. The stop surface 44 is provided to guide the wiper arm element 10 at least partially when folding the wiper arm element 10 away from the vehicle windshield. Alternatively, however, it is also conceivable to arrange a wiper arm element, viewed in the upward movement direction of a wiper arm, below a fastening part and/or centrally on a fastening part. In the latter case, it is also conceivable to dispense with a further partial region with a three-dimensional bend. In this case, the wiper arm element could, in particular, be merely a two-dimensional bend and/or be entirely without a bend. Additionally, a fastening part could at least partially encompass a different number of sides of a wiper arm element. It is also conceivable to dispense with a stop surface.

For spring-loading the wiper arm element 10, the wiper arm element 10 additionally comprises a spring receiver recess 30. The spring receiver recess 30 is arranged in the vicinity of the fastening part 12. The spring receiver recess 30 in the present case is arranged between the partial region 42 and the partial region 43. The spring receiver recess 30 is configured as a slot. The spring receiver recess 30 in this case is stamped into the wiper arm element 10. The spring receiver recess 30 in the present case is arranged such that in the mounted state the spring 32 is arranged at least substantially parallel to the longitudinal direction of extent 46 of the wiper arm element 10. The spring receiver recess 30 in this case is provided for receiving the spring 32, in particular a first side of the spring 32. A second side of the spring 32 is connected to the fastening part 12 and in the present case is arranged, in particular, in a central region of the fastening part 12. Alternatively, however, it is conceivable to dispense with a further partial region with a three-dimensional bend and to arrange a spring in a mounted state at least partially transversely to a longitudinal direction of extent of a wiper arm element.

Figure 7:
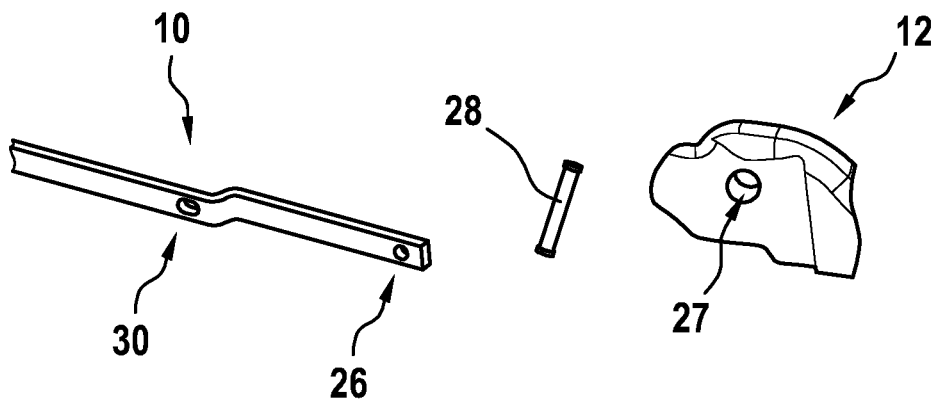
FIG. 7 shows the fastening part and the part of the wiper arm element in an unmounted state.

FIG. 7 also shows the fastening part 12 and the wiper arm element 10 in an unmounted state. The wiper arm element 10 has a joint recess 26 for the articulated connection to the fastening part 12. The joint recess 26 is arranged in the vicinity of the fastening part 12. The joint recess 26 is arranged in an edge region of the wiper arm element 10 facing the fastening part 12. The joint recess 26 is configured as a round hole. The joint recess 26 in this case is stamped into the wiper arm element 10. The joint recess 26 is provided for receiving at least one joint coupling element 28 of the wiper arm device, in particular a first side of the joint coupling element 28. The joint coupling element 28 is configured separately from the wiper arm element 10 and the fastening part 12. The joint coupling element 28 in the present case is configured as a rivet. Advantageously, the joint coupling element 28 in this case is pre-mounted and advantageously pre-riveted in a pre-mounting step in the joint recess 26, whereby in particular a mounting process may be simplified.

Moreover, the fastening part 12 comprises a further joint recess 27 corresponding to the joint recess 26. The further joint recess 27 in this case is provided for receiving a second side of the joint coupling element 28, whereby in particular an axial fixing of the wiper arm element 10 may be achieved. Alternatively, it is conceivable to configure a joint coupling element integrally with a wiper arm element and/or a fastening part. Additionally, a joint coupling element could have on at least one end a groove, in particular in order to avoid riveting, and the axial fixing could take place by means of a plug-on element, such as for example a pushed-on snap ring. Additionally, a compensating disk and annular caulking could also be used for an axial fixing.

What is claimed is:

1. A wiper arm device with an integrally formed, single piece wiper arm element (10) that extends along a direction of main extent (46), is coupled to a fastening part (12) via an articulated connection, and has at least one wiper arm element portion (14) with a longitudinal extent of at least 10% of a total longitudinal extent of the wiper arm element (10), characterized in that the wiper arm element portion (14) has a cross section which differs from an at least substantially U-shaped cross section, wherein a proximal end of the wiper arm element (10) is coupled to the fastening part (12), wherein the proximal end of the wiper arm element (10) is arranged in a lateral region of the fastening part (12) relative to a wiping direction (24), such that a portion of the fastening part (12) is positioned laterally exterior to a lateral outer side of the proximal end of the wiper arm element (10) along the wiping direction (24), wherein the fastening part (12) at least partially encompasses the wiper arm element (10) on at least two sides, wherein the wiper arm device further comprises a spring (32) having a first end coupled directly to the fastening part (12) and a second end coupled directly to the wiper arm element portion (14), wherein the spring (32) extends along a direction that is substantially parallel to the direction of main extent (46), wherein the wiper arm element portion (14) includes a proximal region coupled directly to the fastening part (12), and a distal region located distally relative to the proximal region, wherein the spring (32) extends substantially parallel to the proximal region and is laterally offset from the proximal region, and wherein the spring is axially aligned with the distal region.

2. The wiper arm device as claimed in claim 1, wherein the wiper arm element portion (14) has a region having an S-shaped bend as viewed along a first direction, and wherein the region also has an S-shaped bend as viewed along a second direction that is perpendicular to the first direction.

3. The wiper arm device as claimed in claim 2, wherein the S-shaped bend is located between the distal region of the wiper arm element portion (14) and the fastening part (12), and wherein the second end of the spring (32) is coupled directly to the distal region of the wiper arm element portion (14).

4. The wiper arm device as claimed in claim 1, characterized in that the wiper arm element portion (14) has an at least substantially I-shaped cross section.

5. The wiper arm device as claimed in claim 1, characterized in that the fastening part (12) is rotationally fixed to a drive shaft (40).

6. The wiper arm device as claimed in claim 1, characterized in that the wiper arm element portion (14) has a longitudinal extent of at least 60% of a total longitudinal extent of the wiper arm element (10).

7. The wiper arm device as claimed in claim 1, characterized in that the wiper arm element (10) has at least one further wiper arm element portion (20) arranged in a vicinity of a wiper arm adapter (22).

8. The wiper arm device as claimed in claim 1, wherein the wiper arm element portion (14) has at least two cross sections (16, 18), as viewed along a same direction, wherein main directions of extent of the at least two cross sections (16, 18) are arranged at least substantially perpendicular to one another.

9. The wiper arm device as claimed in claim 1, characterized in that, for articulated connection to the fastening part (12), the wiper arm element (10) has at least one joint recess (26) which is configured for receiving at least one joint coupling element (28).

10. The wiper arm device as claimed in claim 1, characterized in that the wiper arm element (10) has a spring receiver recess (30) which is configured as a slot and is configured to receive the spring (32) for spring-loading the wiper arm element (10).

11. The wiper arm device as claimed in claim 1, further including at least one cover unit (34) which at least partially covers the wiper arm element (10).

12. A wiper arm (36) with at least one wiper arm device as claimed in claim 1.

13. The wiper arm device as claimed in claim 1, wherein a cross-section of the wiper arm element portion (14) is at least substantially constant over an entire longitudinal extent of the wiper arm element portion (14).

14. A wiper arm device with an integrally formed wiper arm element (10) which is coupled to a fastening part (12) and which has at least one wiper arm element portion (14) with a longitudinal extent of at least 10% of a total longitudinal extent of the wiper arm element (10), characterized in that the wiper arm element portion (14) has a region, disposed entirely outside of the fastening part (12), having an S-shaped bend as viewed along a first direction, and wherein the S-shaped bend is shaped such that the S-shaped bend is visible as a further S-shaped bend as viewed along a second direction that is perpendicular to the first direction, wherein the wiper arm element portion (14) has a distal region, wherein the S-shaped bend is located between the distal region and the fastening part (12), and wherein the wiper arm device includes a spring (32) having a first end coupled directly to the fastening part (12) and a second end coupled directly to the distal region of the wiper arm element portion (14).

15. The wiper arm device as claimed in claim 14, characterized in that the wiper arm element portion (14) has an at least substantially I-shaped cross section.

16. The wiper arm device as claimed in claim 14, characterized in that the wiper arm element portion (14) has at least two cross sections (16, 18), wherein main directions of extent thereof being arranged at least substantially perpendicular to one another.

17. The wiper arm device as claimed in claim 14, characterized in that the wiper arm element portion (14) has a longitudinal extent of at least 60% of a total longitudinal extent of the wiper arm element (10).

18. The wiper arm device as claimed in claim 14, characterized in that the wiper arm element (10) has at least one further wiper arm element portion (20) arranged in a vicinity of a wiper arm adapter (22).

19. The wiper arm device as claimed in claim 14, wherein the fastening part (12) at least partially encompasses the wiper arm element (10) on at least two sides.

20. The wiper arm device as claimed in claim 19, characterized in that the wiper arm element (10) is arranged in a lateral region of the fastening part (12), relative to a wiping direction (24).

21. The wiper arm device as claimed in claim 14, characterized in that, for articulated connection to the fastening part (12), the wiper arm element (10) has at least one joint recess (26) which is configured for receiving at least one joint coupling element (28).

22. The wiper arm device as claimed in claim 14, characterized in that the wiper arm element (10) has a spring receiver recess (30) which is configured as a slot and is configured to receive the spring (32) for spring-loading the wiper arm element (10).

23. The wiper arm device as claimed in claim 14, further including at least one cover unit (34) which at least partially covers the wiper arm element (10).

24. A wiper arm (36) with at least one wiper arm device as claimed in claim 14.

25. The wiper arm device as claimed in claim 14, wherein a cross-section of the wiper arm element portion (14) is at least substantially constant over an entire longitudinal extent of the wiper arm element portion (14).

* * * * *